J. H. CHAMP.
BOTTLING MACHINE.
APPLICATION FILED FEB. 5, 1909.
1,001,353.
Patented Aug. 22, 1911.
9 SHEETS—SHEET 1.
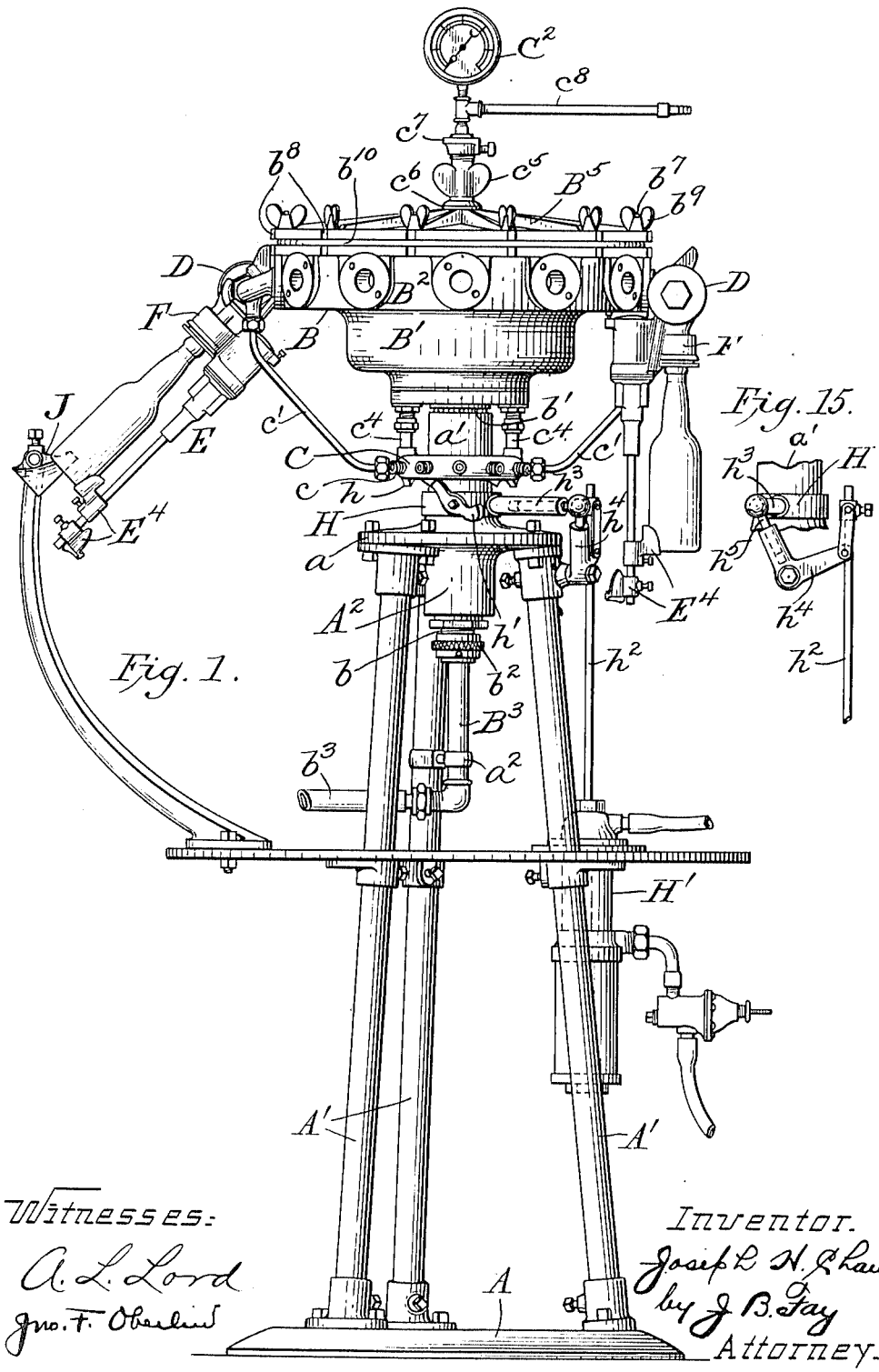

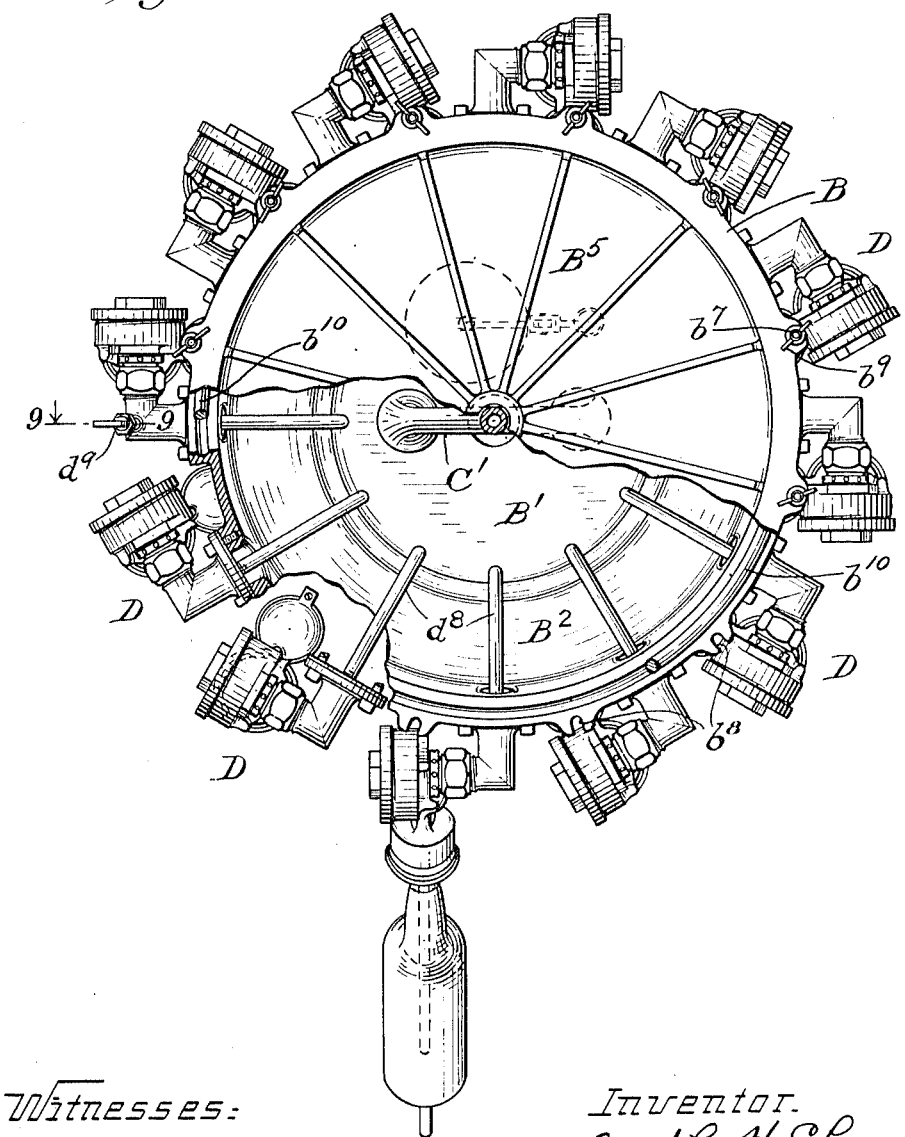

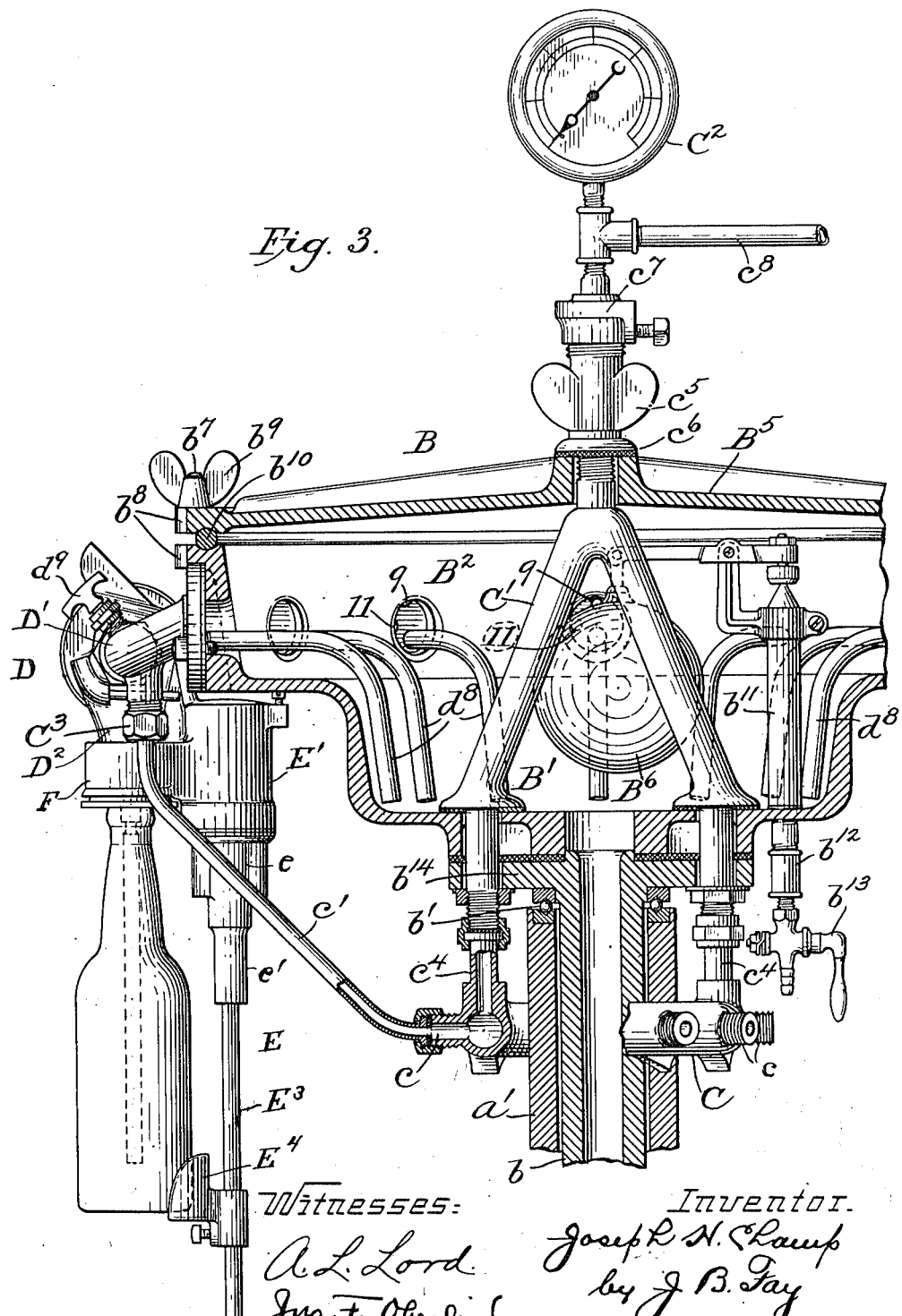

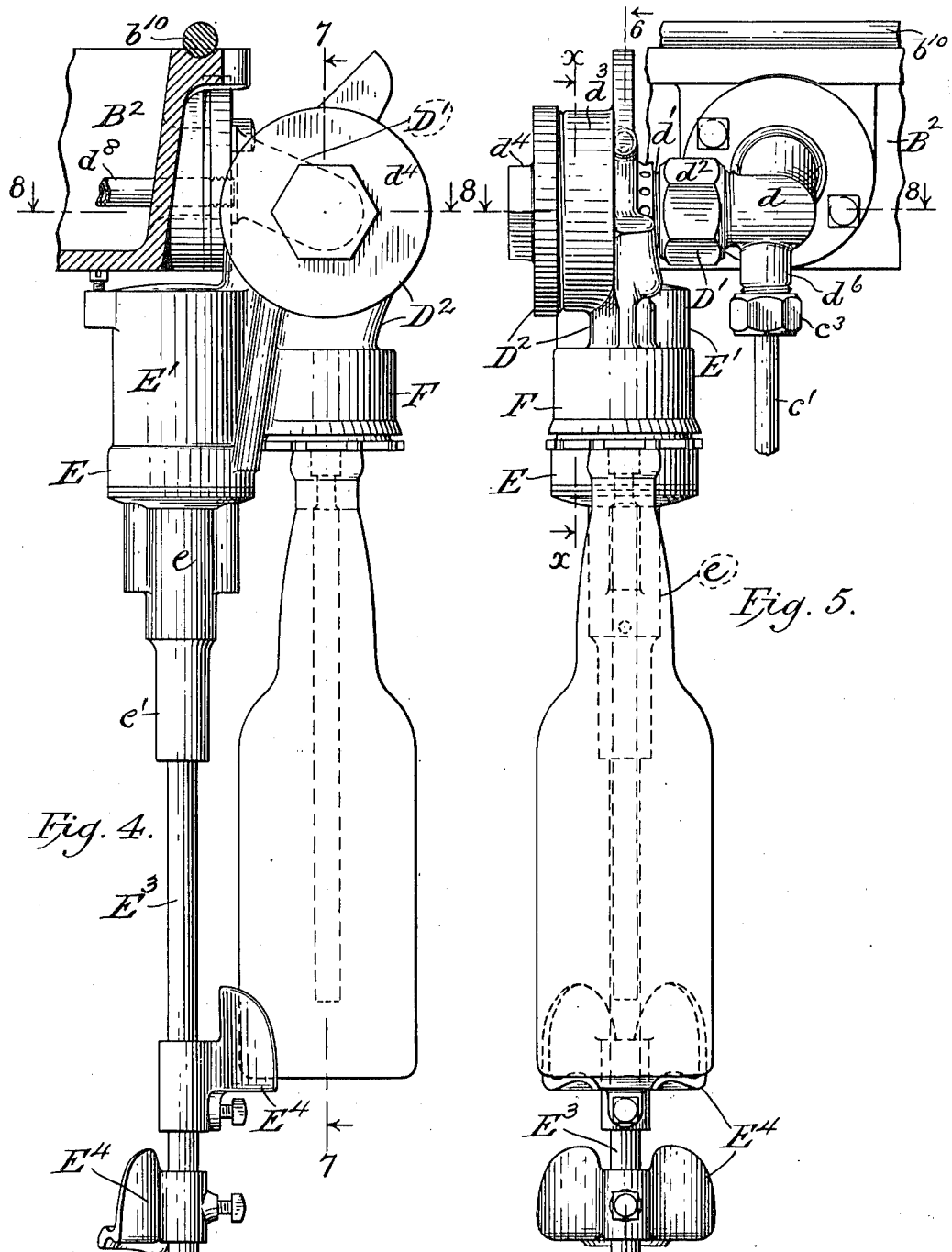

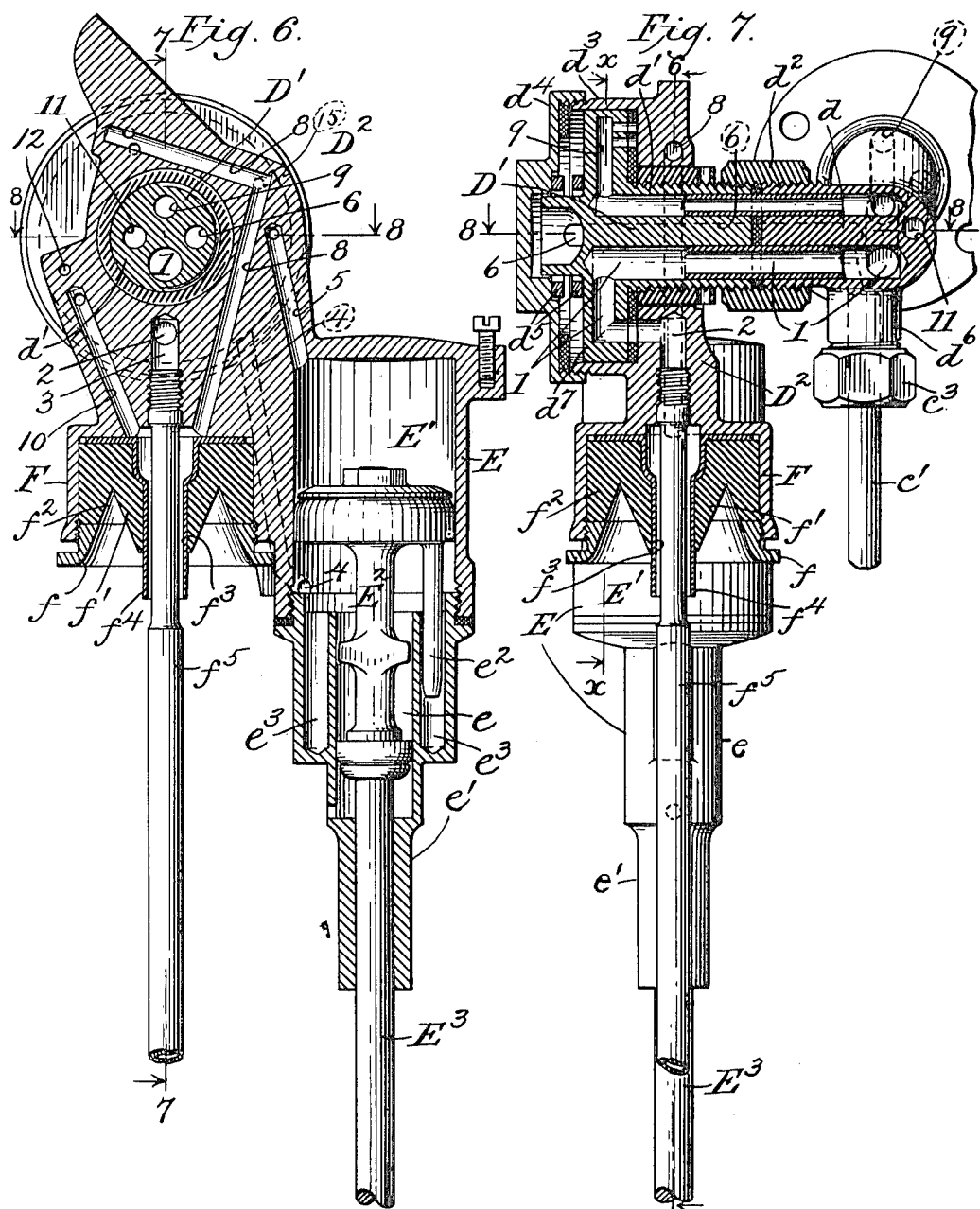

J. H. CHAMP.
BOTTLING MACHINE.
APPLICATION FILED FEB. 5, 1909.

1,001,353.

Patented Aug. 22, 1911.
9 SHEETS—SHEET 6.

Witnesses:
A. L. Lord.
Jno. F. Oberlin.

Inventor.
Joseph H. Champ
by J. B. Fay
Attorney.

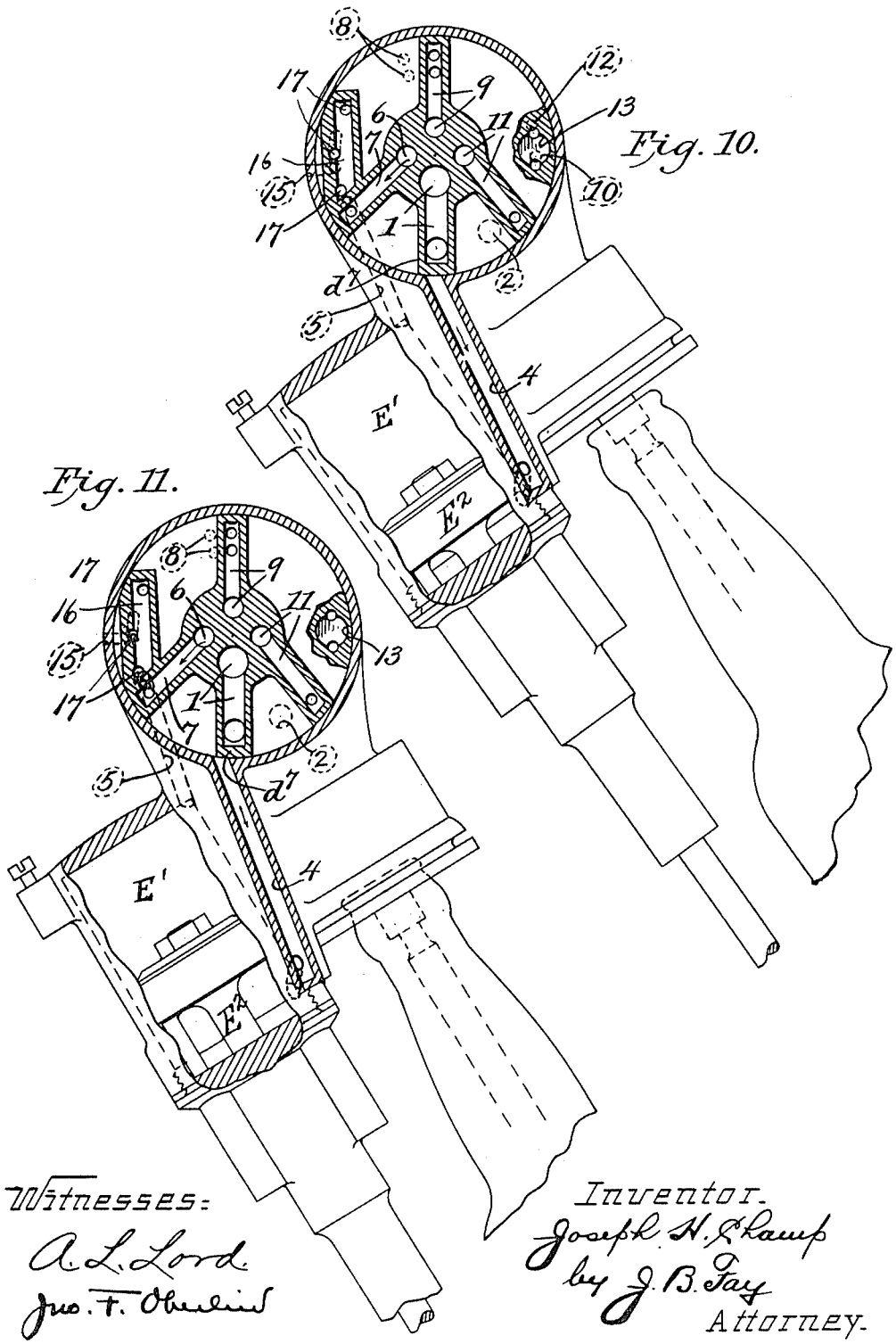

J. H. CHAMP.
BOTTLING MACHINE.
APPLICATION FILED FEB. 5, 1909.

1,001,353.

Patented Aug. 22, 1911.

9 SHEETS—SHEET 8.

Witnesses:
A. L. Lord,
Jno. F. Oberlin

Inventor.
Joseph H. Champ
by J. B. Fay
Attorney.

J. H. CHAMP.
BOTTLING MACHINE.
APPLICATION FILED FEB. 5, 1909.

1,001,353.

Patented Aug. 22, 1911.
9 SHEETS—SHEET 9.

Witnesses:
A. L. Lord.
Jno. F. Oberlin

Inventor.
Joseph H. Champ
by J. B. Fay
Attorney.

UNITED STATES PATENT OFFICE.

JOSEPH H. CHAMP, OF CLEVELAND, OHIO.

BOTTLING-MACHINE.

1,001,353.

Specification of Letters Patent. Patented Aug. 22, 1911.

Application filed February 5, 1909. Serial No. 476,294.

*To all whom it may concern:*

Be it known that I, JOSEPH H. CHAMP, a citizen of the United States, and a resident of Cleveland, county of Cuyahoga, and State of Ohio, have invented a new and useful Improvement in Bottling-Machines, of which the following is a specification, the principle of the invention being herein explained and the best mode in which I have contemplated applying that principle, so as to distinguish it from other inventions.

My present invention, relating as indicated to bottling machines, has more particular regard to machines for filling bottles or other analogous vessels with liquids under pressure, such as beer or carbonated beverages; it is not intended however, to imply by this that the several features of construction, characterizing the invention, are not equally adaptable for use in handling other liquids, and in other connections than those stated. The present invention furthermore belongs to that class of counter pressure bottling machines, wherein fluid pressure is utilized to retain the bottles in place against the filling-head or mouth piece, and among the objects of the invention may be enumerated, the provision of a machine of this general character that may be operated by hand with ease and satisfaction.

To the accomplishment of the above and related ends, said invention consists of the means hereinafter fully described, and particularly pointed out in the claims.

The annexed drawings and the following description set forth in detail certain mechanism embodying the invention, such disclosed means constituting, however, but one of various mechanical forms in which the principle of the invention may be used.

Figure 9:
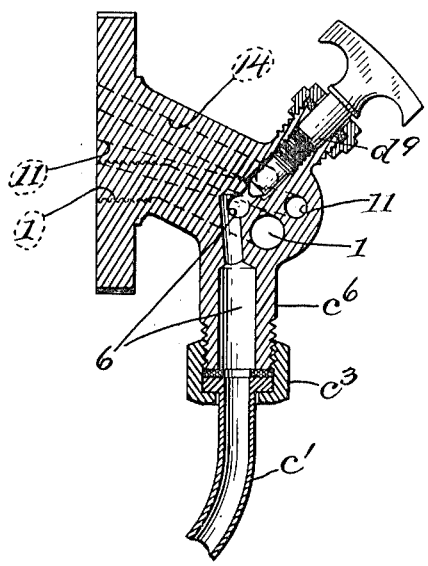
Figure 8:
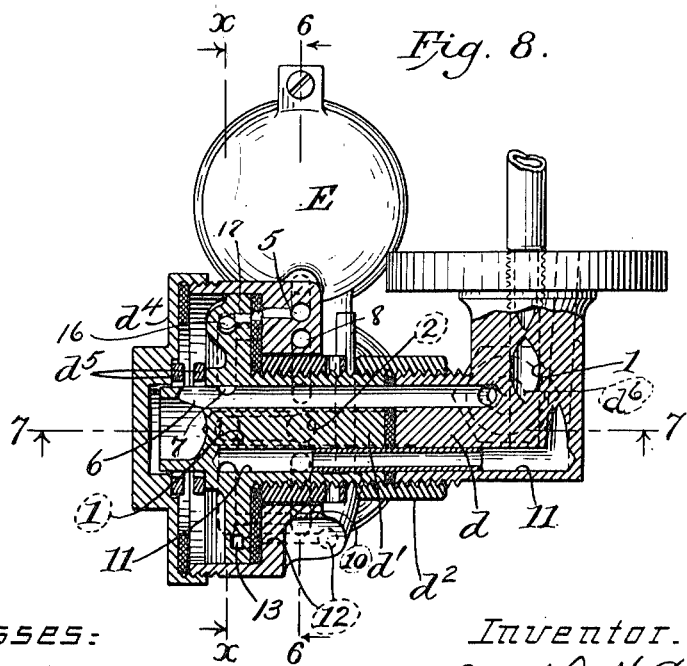
Figure 12:
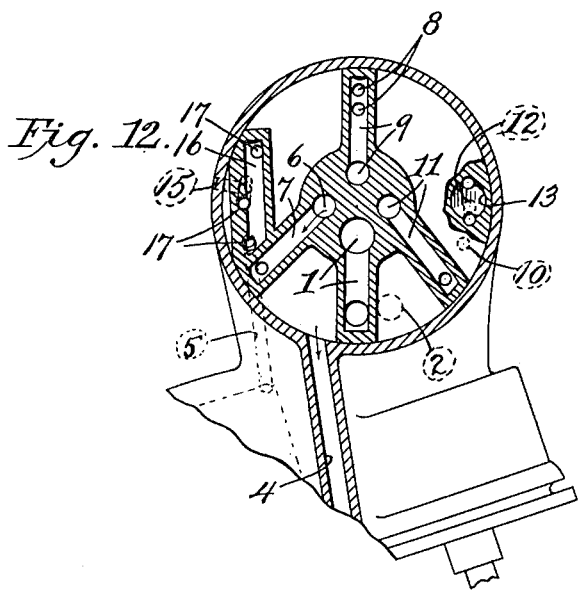
Figure 13:
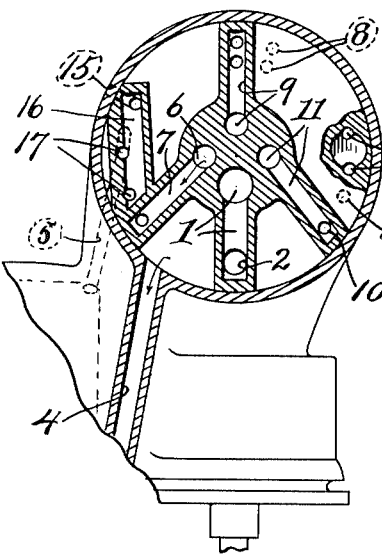
Figure 14:
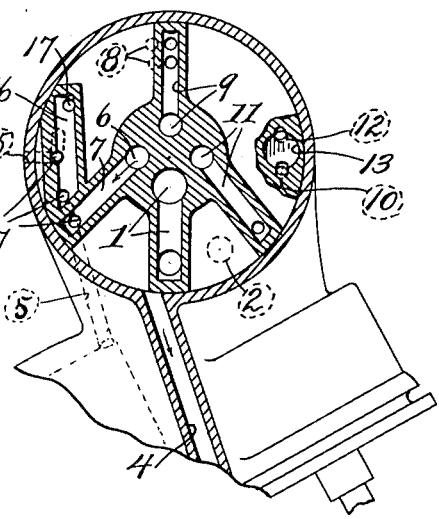
Figure 16:
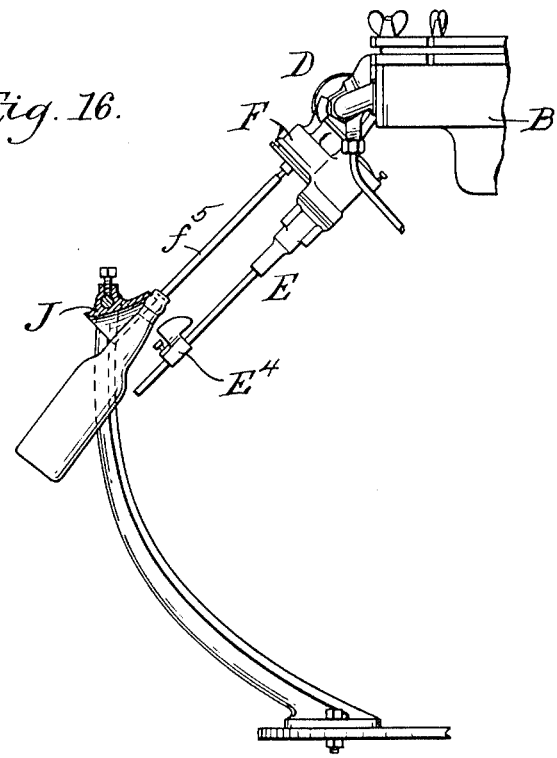
Figure 17:
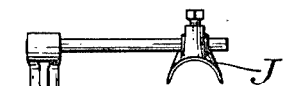

In said annexed drawings:—Figure 1 is a side or front elevational view of a machine embodying my several improvements; Fig. 2 is a top plan view of the machine with parts broken away, and still other parts shown in section; Fig. 3 is a vertical central cross-section of the machine; Figs. 4 and 5 are respectively a side and front elevation of the bottle-filling-fluid distributing, or bottle filling device, proper, in which the several parts thereof appear as when the bottle is being filled; Fig. 6 is a vertical sectional view of such distributing, or filling, device taken on the line 6—6, Fig. 5; Fig. 7 is a sectional view at right angles to that of Fig. 6, the plane of the section being indicated by the line 7—7, Fig. 4; Fig. 8 is a horizontal sectional view of the distributing or filling device, taken on the line 8—8, Figs. 4 and 5; Fig. 9 is a vertical sectional view of a detail of such distributing, or filling, device, including a certain modification in construction, the plane of the section being indicated by the line 9—9 Fig. 2; Figs. 10, 11, 12, 13 and 14 are transverse sectional views of the distributing or filling device taken on the line $x$—$x$ Figs. 5 and 7, and respectively showing the parts thus sectioned, in what I shall hereafter term their inoperative, and their first, second, third and fourth operative positions; Fig. 15, is a side elevational view of a detail of a mechanism for rotating the machine, where such rotation is desired; and Figs. 16 and 17 are elevational views of a guide that I employ in directing empty bottles properly into their places on the machine, as successive distributing, or filling, devices are presented to the operator.

The various mechanisms and parts that enter into the construction of my improved bottling machine are conveniently supported upon a frame comprising a base or bed plate A, on which are mounted three legs A' disposed to form a tripod, and connected at their upper ends by a cast metallic head A². Such head comprises a horizontally disposed plate portion $a$, and, integral therewith, a vertical centrally disposed tubular portion $a'$, that extends some distance above and below the plate. On the frame or stand thus provided, is rotatably mounted the bottle-filling-fluid reservoir or tank B, such tank being shown in plan and partial horizontal section in Fig. 2, and in vertical section in Fig. 3, from which it will be seen to have the usual circular or general cylindrical form. As a variation, however, from such general form, I propose, in the present instance, to form the tank with a central depressed portion B' deeper than the body B² of the tank, so as to require the retention therein of a relatively smaller body of the liquid, while still providing ample room for the super-natant layer or stratum of pressure fluid, either air or carbonic acid gas.

Tank B is mounted on the head A² of the frame or stand, by being provided with a central downwardly extending hollow shaft $b$ that is inserted in the tubular portion $a'$ of the head and extends some distance below the lower end of the latter. To facilitate the rotation of the tank upon the head, ball-bearings $b'$ may be interposed between the tank bottom and the upper end of the tubular portion $a'$ as shown in Figs. 1 and 3. The lower projecting extremity of tubular shaft $b$ is connected with an alined beer supply pipe $B^3$, by means of a union joint $b^2$ that is adapted to permit relative rotary movement between the two, the supply pipe being supported as also held against rotation by means of an arm or bracket $a^2$ secured to one of the legs $A'$. To such beer supply pipe suitable flexible connection $b^3$ is had from the general source of supply as a keg, barrel or the like (not shown).

Tank B, which has already been described so far as its form is concerned, is provided with a removable cover $B^5$. For the retention of this cover securely in place, a plurality of peripherally disposed set bolts $b^7$ are provided, being seated in registering notches $b^8$ in the flanged rim of the tank and overlapping edge of the cover. A suitable gasket $b^{10}$ of rubber or like material is introduced between such tank rim and the cover, Figs. 2 and 3, and the nuts $b^9$ of the bolts are conveniently winged in order to facilitate the securing of an air tight closure. Mounted within the tank and to one side of the center of the same, is a suitable ball float $B^6$ adapted to control an air escape device with which the tank is provided, and by means of which the supply of beer to the latter is controlled. The support $b^{11}$ for such float and accessory parts rises from the bottom of the tank, and the discharge $b^{12}$ of the device through which superfluous pressure fluid from within the tank is permitted to escape, opens downwardly through such bottom, being controlled by a cock $b^{13}$ on its outer end.

Below the tank B and surrounding the vertical tubular portion of the head $A^2$ is an annular reservoir C that is supported from such tank by means of two vertical tubes $c^4$, whereby connection is at the same time had with the lower ends of a bifurcated pipe $C'$ within the tank. The support and connections for reservoir C just described, are furthermore utilized to secure the tubular inner shaft $b$, through which the beer is supplied, to the bottom of such tank, as shown in Fig. 3. To this end, the upper terminal of the shaft is provided with a wide flange $b^{14}$ through which the lower ends of the bifurcated pipe $C'$ pass, the upper end of such last named pipe extending centrally through the cover $B^5$ of the tank, and a suitable winged collar $c^5$ and interposed gasket $c^6$ being provided to assist in making an air-tight joint at the point where the cover is pierced. To the upper projecting end of the pipe is joined an extraneous pressure fluid supply pipe $c^8$ by means of a union $c^7$ that permits rotation of the end of the pipe with respect to the supply pipe, while still maintaining a tight joint. A gage $C^2$ is conveniently attached to the external supply pipe near where it is thus joined to the bifurcated pipe $C'$.

Equidistantly mounted about the periphery of the tank portion $B^2$ having the larger diameter, is provided a series of bottle filling members, or distributing devices D, which I shall now proceed to more particularly describe. In this description, I shall have regard to a single device, since the others, of which the number will of course depend upon the size or capacity of the machine, will be but duplicates thereof. Each such distributing device, then, comprises (Figs. 4 to 8 inclusive), a fixed valve member $D'$ and a movable valve member $D^2$, to which latter is attached so as to be movable therewith, a bottle-holding device E and a bottle mouth-piece F. In fact, I preferably form in practice, the base structure of these devices integral with such valve member $D^2$. Bottle-holding device E comprises a cylinder $E'$ whose axis lies substantially at right angles to the axis of oscillation of the device as a whole. The lower end of this cylinder comprises an elongated cylinder head $e$ that is formed with an integral bearing $e'$ adapted to accommodate a rod $E^3$ of a differential piston $E^2$ reciprocally mounted in the cylinder. Piston-rod $E^3$ extends downwardly for some distance below the lower end of the cylinder $E'$, and adjustably mounted thereon, are two bottle rests or stirrups $E^4$ of any approved design. These stirrups are suitably spaced apart upon the piston rod, and disposed diametrically opposite each other with respect to the axis of the latter, so that by rotating the piston through an angle of 180 degrees, one or the other of such stirrups will be presented in operative position. Projecting downwardly from the flattened upper end of the piston, which constitutes the larger member of the differential piston $E^2$, and parallel with the rod $E^3$, is a pin $e^2$ that is adapted to register in either of two apertures $e^3$ formed laterally of that portion of the cylinder head $e$ in which the smaller piston member reciprocates. These apertures and the pin designed to engage therewith, are of such a length that the pin can be disengaged only when the piston head is raised to its extreme upper position in the cylinder $E'$, which position is not attained in the course of the normal operation of the piston. By purposely raising the piston, however, into such position, it may be partially rotated, and then be again secured against any but such longitudinal movement in either of its two axial positions.

A bottle properly seated upon the corresponding rest or stirrup $E^4$ is designed to be raised by the latter, upon the upward movement of the piston, into engagement with bottle mouth piece F. This mouthpiece (Figs. 6 and 7) is of substantially inverted cup shape, there being retained within the same, by means of a threaded washer $f$, a rubber gasket $f'$, having an annular groove $f^2$ of V cross-section on its under side, and a central opening $f^3$. Fitted in the opening $f^3$ and projecting therethrough for a short distance, is a tube $f^4$, such tube being retained in place by having its upper end flanged to form a washer that is clamped between the gasket and the end of the mouth-piece cup. This tube communicates with passages in the two valve members, as will be presently set forth. Located within such tube $f^4$ is a second tube $f^5$, of smaller diameter, through which the liquid, wherewith the bottle is designed to be filled, may be conducted into the interior of the latter.

The valve which I here employ is of the disk type, and the fixed member D' heretofore referred to comprises two sections $d\ d'$ that are drawn together by a nut $d^2$ as will appear from an inspection of Figs. 7 and 8, the contacting or ported face of such member being directed reversely or toward the flanged base whereby it is secured to the wall of tank B. The corresponding ported face of the movable valve member $D^2$, is formed with a flange $d^3$ about its edge that in conjunction with a cap $d^4$ threaded thereon incloses the disk portion of the fixed member. A spring $d^5$ interposed between this cap and such disk portion assists in maintaining the desired close contact between the ported faces of the two members, although as will be presently explained, I do not rely on such spring entirely for the purpose of securing the desired contact.

Communication between annular pressure fluid reservoir C and the piston cylinder to variously actuate the piston therein, as also communication between the interior of the tank B and the bottle to introduce in succession the necessary counter pressure and the filling liquid within the latter, and to permit the escape of pressure fluid therefrom, are all secured through a suitable arrangement of passages in the fixed and movable valve members, connection between which is had upon the proper alinement of the corresponding ports in the faces of the disk portions of said members. These passages will now be described more particularly, and thereupon the manner, in which they thus operate to secure the desired ends, explained.

The pressure fluid, which will generally be compressed air, is contained in the reservoir C and is conducted from the latter to each of the several distributing devices by means of a duct $c'$ secured at its inner end upon a nipple $c$ radially projecting from said reservoir, and at its outer end by a union $c^3$ with an apertured boss $d^6$ that projects downwardly from the base portion of the fixed valve member D'. Communicating with the aperture in such boss, is a passage 6 Fig. 8, that extends longitudinally through the fixed valve member, and opens freely into the chamber formed between the outer face of the disk portion of said member and the cap $d^4$ mounted on the movable valve member $D^2$ that incloses such face. By reason of this arrangement, it will be obvious that the two disk portions of the valve members are at all times held together by the full pressure utilized in operating the piston, so that a tight fit between the contacting faces of the disk portions is insured, irrespective of the action of the spring $d^5$. The contact pressure secured in this fashion, will always be uniform, and never excessive, while still being sufficient to prevent leaking past the faces in question. From the chamber to which the air under pressure is thus seen to be admitted, such pressure fluid is in turn adapted to be conducted to the under side of the main member of differential piston $E^2$ through a port 4 which although shown as being covered in the inoperative positions of the device by a raised lug $d^7$ on the outer face of the fixed valve member D' is not closed to the passage of air. Similar communication between the main air supply passage 6 and the upper portion of the piston cylinder may be had through a passage 5 in the movable valve member $D^2$ leading to such cylinder portion and another passage 7 in the fixed valve member, when the ports formed by the openings of these passages in the respective contacting faces of said members are in register. The port of passage 5 is furthermore adapted in yet another position of the movable valve member, to communicate with a chamber 16 in the fixed member having a series of ports 17 adapted successively to register with a passage 15 in the movable member opening directly to the atmosphere.

For admitting the counter pressure to the bottle, a passage 9 is provided in the fixed valve member that is adapted to be connected with a passage 8 in the movable valve member; while for venting the pressure fluid upon the admission in turn of the beer, a vent passage 11 is provided in the fixed valve member adapted to be connected with a corresponding passage 10 in the movable valve member. Both such counter-pressure supply and vent passages open directly into the upper portion $B^2$ of the reservoir or tank B, see Figs. 3 and 9. For admitting the beer to the bottle, a passage 1 in the fixed valve member and a corresponding passage 2 in the movable valve member are provided. Such passage 2 is connected with the filling tube previously referred to, while passage 1 opens into the tank B but not directly as in the case of the pressure supply and vent passages, an induction tube $d^8$, curved downwardly into the depressed portion B' of the tank, being inserted therein, so as to withdraw the beer, the level of which should not rise above such portion. In addition to the foregoing passages another passage 13, in the fixed valve member and a corresponding passage 12 in the movable valve member are provided as a final venting passage for relieving any excess pressure that may have developed in the bottle after the closure of the beer filling and normal venting passages; also a passage, or by-way 14 is provided in the base portion of the fixed valve member leading from main air passage 6 directly to the upper portion of the tank B. This by-passage is controlled by a needle valve $d^9$ Figs. 3 and 9, and is opened only at the beginning of the operation of filling, in order that a proper counter-pressure may be provided within the tank, prior to the introduction of the beer therein.

A statement of the manner in which the foregoing passages coöperate during the operation of filling a bottle, will further assist in describing their form and arrangement. As has just been stated, a preliminary step is the raising of the counter-pressure within the tank by opening valve $d^9$, whereupon supply connections $b^3$ may be opened and beer allowed to flow into the tank. It will be understood, of course, that the escape cock on the under side of the tank will not be fully opened until the beer within the tank reaches the proper level to operate the float $B^6$, for otherwise such float will be ineffective to control the escape device. Assuming conditions within the tank then to have reached a state of equilibrium, wherein the float serves to maintain a proper pressure and liquid level in the tank, the filling operation proper may be described. Such operation consists outwardly simply in approaching the bottle to a filling device so as to direct the mouth of the latter around the filling tube $f^5$, Fig. 16, and stepping the bottom of the bottle onto the stirrup borne by the piston rod, it being understood of course, that the latter has been properly adjusted to correspond with the size of the bottle in hand; thereupon a rotative movement of the device is effected by pressing against the side of the bottle, so that the latter, which initially occupies the position indicated in Fig. 10, will in its final position appear as in Fig. 4. In this condition the device is designed to be carried by the rotative movement of the reservoir B until it is again brought around to substantially the same position. It now can be removed by a reversal of the movement just described, Fig. 1, and a fresh bottle inserted in its stead. Both the insertion of the bottle and such removal thereof, will be effected of course, by a single continuous movement, but I shall resolve such movement into four stages for the purpose of describing the coöperation of the valve passages under consideration, namely, the normal inoperative position shown in Fig. 10, and the first, second, third and fourth operative positions illustrated respectively in Figs. 11, 12, 13 and 14. In the inoperative position of Fig. 10, passage 5 is in register with passage 7, thus admitting pressure to the upper end of cylinder E', and as a result, the bottle-supporting piston rests in its lowermost position. In the first operative position of the parts (Fig. 11), such position resulting upon a slight operative movement of the movable valve member and appurtenant parts, passage 5 is closed to the admission of the pressure fluid, with the result that the piston will be raised and the mouth of the bottle brought into close fitting contact with the bottle filling mouthpiece. This position of the piston and bottle continues throughout the remaining operative positions of the parts. In the second operative position, (Fig. 12) passages 8 and 9 are brought into register with the result that pressure fluid from the reservoir B is admitted into the bottle through the annular passage surrounding the filling tube $f^5$ in the bottle mouth-piece. In the third operative position, corresponding to the vertical disposition of the piston and bottle, (Fig. 13) such connection between passages 8 and 9 is closed, but a corresponding connection between passages 10 and 11, whereby the pressure thus admitted may be vented in turn back to the reservoir, is secured, as also connection between passages 1 and 2 whereby the beer is permitted to flow from such tank into the bottle. This flow will be wholly under the influence of gravity, by reason of the prior admission into the bottle of the same counter-pressure as obtains in the tank, and the venting of this pressure will proceed no faster than is rendered necessary by the influx of the liquid. When the bottle is finally brought around to the point where it is to be removed, the preceding connections will be had in reverse order, and also a connection, not previously referred to, between passages 10, 13 and 12, (Fig. 14) by means of which an opportunity is afforded for finally venting to the atmosphere any excess pressure that may have developed upon the closure of the passages 10 and 11. The tendency, that might otherwise manifest itself, for a portion of the liquid in the bottle to effervesce and overflow under the expansive force of the compressed gas, is thus safely obviated.

While it is contemplated that the machine may be operated entirely by hand, in other words, that both the oscillation of the several bottle-filling or distributing devices D, and the rotation of the apparatus as a whole, may be manual; it will be desirable under certain circumstances to use power means for obtaining such last-named movement. In the apparatus, accordingly, as illustrated in Fig. 1, I show one approved arrangement of mechanism for obtaining this result. Such mechanism includes an annular rack, or ratchet, carried by the rotatable liquid reservoir B and conveniently provided by forming teeth $h$ on the under side of reservoir C. Two pawls $h'$ adapted to coöperate with such teeth are borne on opposite sides of a collar H that is rotatably mounted upon the tubular extension $a'$ of frame head $A^2$; by imparting a suitable oscillatory movement to this collar a step-by-step movement is given the reservoir B so as to bring successive devices D into position before the operator. The power means for thus oscillating collar H, consist, as illustrated, in a vertically disposed reciprocatory hydraulic motor H', the piston rod $h^2$ of which is connected with a rod $h^3$ projecting radially from the collar by means of a bell-crank $h^4$. The necessary universal movement in the connection between the bell-crank and rod $h^3$ is secured by rotatably mounting on the latter an arm $h^5$ that is both rotatably and slidably held in the corresponding bell-crank arm. Obviously other forms of motor can be utilized instead of the hydraulic motor shown, or, if desired a treadle can be readily substituted by being connected directly with the lower end of rod $h^2$. Since, however, the object in thus turning the machine, instead of relying on the rotary impulse that might be given it as the bottles are placed in the distributing devices, is to insure a maximum degree of diligence on the part of the operator, some independent form of power drive that will operate at a predetermined rate of speed is preferable to a treadle.

In order to reduce the time that would otherwise be lost by the operator in locating the empty bottle with respect to the filling tube of a distributing device, I further provide, where a power drive is thus used, a guide J, Figs. 16 and 17, which guide is located in proper relation to the machine to direct a bottle onto successive distributing devices, as the latter are brought adjacent to its upper end by the step-by-step movement of the machine. The operator hence need merely slide the empty bottle up along the guide with one hand, no attention whatever being necessary to accurately center the same on the filling tube, while with the other he removes the filled bottles and places them on a suitable conveyer or other carrier, by which they may be taken to the corking machine.

It has been indicated that while perhaps the invention will find its greatest field of usefulness in the bottling of beer, it is equally adapted for the handling of other liquids. Accordingly, wherever the term beer may occur in the foregoing description or the following claims, the same should be understood as including, under the rule of equivalents, any suitable fluid, as a known substitute for beer. So too the invention may be used to fill any suitable vessels; wherever the term bottle may occur in the foregoing description or the following claims the same should be understood as including, under the rule of equivalents, any suitable vessel, as a known substitute for the bottle. And while, for obvious present practical reasons, I have referred to the use of air for charging the empty bottles and for actuating the piston means for the movable bottle rests I should have it understood that wherever the term air may thus occur in the foregoing description or the following claims I mean to include any suitable fluid as a known substitute for air.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invertion:—

1. In a bottle-filling machine, the combination of a rotatable fluid reservoir having a plurality of fluid distributing devices oscillatory about horizontal axes, bottle-holding means in connection with each such distributing device, and stationary means located adjacent to the path of travel of said devices and adapted to guide bottles thereon.

2. In a bottle-filling machine, the combination of a rotatable fluid reservoir having a plurality of fluid distributing devices, oscillatory about horizontal axes, bottle-holding means in connection with each such distributing device, said distributing device and holding means being both inoperative in one angular position of the device about its axis, and stationary means located adjacent to the path of travel of said devices and adapted to guide bottles thereon when in such inoperative position.

3. In a bottle-filling machine, the combination of a rotatable fluid reservoir having a plurality of fluid distributing devices oscillatory about horizontal axes, bottle-holding means in connection with each such distributing device, said distributing device and holding means being both inoperative in one angular position of the device about its axis, means for imparting progressive step-by-step movement to said reservoir, and stationary means located adjacent to the path of travel of said devices and adapted to guide bottles thereon when in such inoperative position.

4. In a machine of the class described, a bottle-filling device, comprising two members, said members being respectively provided with disk valves, adapted to variously coöperate upon relative movement therebetween, and fluid pressure means for holding said valves in contact.

5. In a machine of the class described, a bottle-filling device, comprising a stationary member, an oscillating member, said members being respectively provided with disk valves adapted to variously coöperate upon movement of said oscillating member, and fluid pressure means for holding said valves in contact.

6. In a machine of the class described, a bottle-filling device, comprising a stationary member formed terminally with a disk valve having its inturned face ported, a member oscillatorily mounted upon said stationary member and provided with a disk valve coöperative with the valve thereon, and fluid pressure means for holding said valves in contact.

7. In a machine of the class described, a bottle-filling device, comprising a stationary member formed terminally with a disk valve having its inturned face ported, a member oscillatorily mounted upon said stationary member and provided with a disk valve coöperative with the valve thereon, said oscillatory member also inclosing the outer face of said first-named valve, and fluid-pressure connections to the chamber between said first-named valve and such inclosing portion of said oscillatory member.

8. In a machine of the class described, a bottle-filling device, comprising a stationary member formed terminally with a disk valve having its inturned face ported, a member oscillatorily mounted upon said stationary member and provided with a disk valve coöperative with the valve thereon, a cap mounted upon said last-named valve inclosing the outer face of the other, and fluid pressure connections to the chamber between such other valve and said cap.

9. In a machine of the class described, a bottle-filling device, comprising a stationary member formed terminally with a disk valve having its inturned face ported, a member oscillatorily mounted upon said stationary member and provided with a disk valve coöperative with the valve thereon, a cap mounted upon said last-named valve inclosing the outer face of the other, and fluid pressure connections to the chamber between such other valve and said cap, such connection including a passage through said stationary member and opening into such chamber.

Signed by me this 28th day of January, 1909.

JOSEPH H. CHAMP.

Attested by—
  MARY GLADWELL,
  JNO. F. OBERLIN.